United States Patent [19]
Dula, III et al.

[11] Patent Number: 5,455,709
[45] Date of Patent: Oct. 3, 1995

[54] TOTAL INTERNAL REFLECTION SPATIAL LIGHT MODULATION APPARATUS AND METHOD OF FABRICATION THEREOF

[75] Inventors: Thomas C. Dula, III, Winter Springs, Fla.; Paul J. Caldwell, Baltimore; Alex E. Bailey, Hampstead, both of Md.

[73] Assignee: Martin Marietta Corporation, Bethesda, Md.

[21] Appl. No.: 48,331

[22] Filed: Mar. 23, 1993

[51] Int. Cl.$^6$ .................. G02F 1/36; G02F 1/03; B23K 26/00; G02B 26/00
[52] U.S. Cl. .................. 359/245; 359/240; 359/246; 359/247; 359/316; 359/263; 359/318
[58] Field of Search .................. 359/240, 245, 359/247, 246, 316, 318, 263

[56] References Cited

U.S. PATENT DOCUMENTS

| | | | |
|---|---|---|---|
| 2,281,280 | 4/1942 | Gabor | 250/164 |
| 3,307,897 | 3/1967 | Lohmann | 88/61 |
| 3,376,092 | 4/1968 | Kushner et al. | 350/285 |
| 3,435,445 | 3/1969 | Clendinning et al. | 340/324 |
| 3,520,595 | 7/1970 | Treuthart | 350/285 |
| 3,535,993 | 10/1970 | Jones | 95/18 |
| 3,635,082 | 1/1972 | Prellwitz et al. | 73/194 |
| 3,649,105 | 3/1972 | Treuthart | 350/285 |
| 3,667,830 | 6/1972 | Rottmiller | 350/161 |
| 3,671,105 | 6/1972 | Williams et al. | 350/161 |
| 3,698,793 | 10/1972 | Tellerman | 350/160 |
| 3,704,936 | 12/1972 | Gorkiewicz et al. | 350/161 |
| 3,985,952 | 10/1976 | Adler | 178/66 |
| 4,001,635 | 1/1977 | d'Auria et al. | 315/169 |
| 4,016,415 | 4/1977 | O'Meara | 250/201 |
| 4,087,810 | 5/1978 | Hung et al. | 340/324 |
| 4,146,307 | 3/1979 | Gaffard | 350/285 |
| 4,298,247 | 11/1981 | Michelet et al. | 350/295 |
| 4,419,663 | 12/1983 | Kohashi | 340/783 |
| 4,480,899 | 11/1984 | Sprague | 350/356 |
| 4,635,082 | 1/1987 | Domoto et al. | 346/160 |
| 4,639,073 | 1/1987 | Yip et al. | 350/68 |
| 4,675,500 | 6/1987 | Kunz et al. | 219/121 |
| 4,710,732 | 12/1987 | Hornbeck | 332/7.51 |
| 4,789,228 | 12/1988 | Le Pesant et al. | 350/535 |
| 4,979,789 | 12/1990 | Um | 350/96.14 |
| 5,078,479 | 1/1992 | Vuillemier . | |
| 5,083,857 | 1/1992 | Hornbeck | 359/291 |
| 5,085,497 | 2/1992 | Um et al. | 359/848 |
| 5,155,617 | 10/1992 | Solgaard et al. | 359/247 |

Primary Examiner—Viet Q. Nguyen
Attorney, Agent, or Firm—Finnegan, Henderson, Farabow, Garrett & Dunner

[57] ABSTRACT

Total internal light spatial light modulation apparatus includes a light source for projecting infrared light; a prism for reflecting the projected light from an internal surface therein; and an array of pixel posts made of electrostrictive material and positioned proximate a back face of the internal surface for selectively eliminating pixel areas of reflection of the projected light to form an image thereby. A multiplexer is provided to select a set of pixel posts to be electrically charged which corresponds with the image, and electrical contacts are formed on each pixel post no permit electrical charging of each selected pixel post. Method of fabricating the pixel post array, wherein each row of the pixel post array is formed as a monolithic structure, includes the steps of providing a slab of alternate layers of ferroelectric and electrically-conductive material; vapor-depositing electrical contacts on the slabs in electrical communication with the layers of electrically-conductive material at locations corresponding to the pixel posts to be fabricated; securing the slabs together in a front-to-back relationship with divider plates positioned therebetween; and cross-cutting a number of grooves through the slabs to define the pixel posts of each row.

16 Claims, 6 Drawing Sheets

TOTAL INTERNAL REFLECTION SPATIAL LIGHT MODULATION APPARATUS AND METHOD OF FABRICATION THEREOF

BACKGROUND OF THE INVENTION

1. Field of the Invention

The present invention relates to a spatial light modulation apparatus for generating scenes and images. In particular, the present invention is directed to a spatial light modulation apparatus which utilizes total internal reflection for animated scene generation, and a method of fabricating an integral component of the spatial light modulation apparatus.

2. Description of the Prior Art

A spatial light modulation apparatus is an optical device used to modulate incident light into specific, desired patterns. As is well known, light may be modulated with regard to its intensity, direction, phase, frequency or polarization. Through modulation of these characteristics, simple light beams may be processed so as to enable virtually instantaneous transmission of images, information, and data.

It is not surprising that new applications for spatial light modulation apparatus are continually being identified in today's advancing technology. Examples of common devices which utilize spatial light modulation apparatus include photocopiers, printers, television monitors and projection devices. More unique applications of the spatial light modulation device may be found in matrix addressing devices, laser and optical processors, and optical weapons systems.

Due to its numerous applications and benefits, a variety of concepts have been developed for the fabrication and structure of spatial light modulation apparatus. For example, spatial light modulation apparatus have been developed which utilize variations of electro-optic fluids. See, U.S. Pat. No. 3,435,445 issued to Clendinning et al.; U.S. Pat. No. 4,419,663 to Kohashi; and U.S. Pat. No. 4,635,082 to Domoto et al. Alternatively, spatial light modulation apparatus which alter reflective planar surfaces to modulate incident light have also been developed. See, U.S. Pat. No. 4,016,415 to O'Meara; U.S. Pat. No. 4,146,307 to Gaffard; U.S. Pat. Nos. 4,710,732 and 5,083,857 to Hornbeck; U.S. Pat. No. 5,078,479 to Vuilleumier; and U.S. Pat. No. 5,085,497 to Um et al. Further, spatial light modulation apparatus have been developed which deform reflective surfaces or films to modulate incident light. See, U.S. Pat. No. 2,281,280 issued to Gabor; U.S. Pat. No. 3,667,830 to Rottmiller; U.S. Pat. No. 3,704,936 to Gorkiewicz et al.; U.S. Pat. No. 3,985,952 to Adler; U.S. Pat. No. 4,001,635 to d'Auria et al.; U.S. Pat. No. 4,087,810 to Hung et al.; and U.S. Pat. No. 4,298,247 to Michelet et al.

Additional efforts in the development of spatial light modulation apparatus have been directed toward the use of total internal reflection. Some concepts which have been developed use layers of electro-optic fluid to frustrate total internal reflection. See, U.S. Pat. No. 3,307,897 issued to Lohmann; and U.S. Pat. No. 4,789,228 to Le Pesant et al. Other concepts attempt to distort total internal reflection by positioning charged electrodes behind the reflective surface. See, U.S. Pat. No. 4,639,073 issued to Yip et al.; and U.S. Pat. No. 4,480,899 issued to Spraque. While still others frustrate or alter total internal reflection by moving structural members toward the reflective surface. See, U.S. Pat. No. 3,376,092 issued to Kushner et al.; U.S. Pat. Nos. 3,520,595 and 3,649,105 to Treuthart; U.S. Pat. No. 3,535,993 to Jones; and U.S. Pat. No. 4,675,500 to Kunz et al.

However, these spatial light modulation apparatus generally have not been accurate enough to generate high definition images and scenes, while still durable enough to withstand extreme operational conditions. In particular, spatial light modulation apparatus utilized for optical weapons systems monitoring and alignment must not only be capable of generating images of high precision, but also be capable of enduring combat conditions. The spatial light modulation apparatus which utilize thin structural members or electro-optical fluids are unlikely to withstand such abusive operational conditions, while those which utilize electrodes to modulate incident light typically lack the required precision for generating high definition images.

It is noted that Kushner et al. show a solid state display; however, commonly a signed U.S. Pat. No. 3,698,793 issued to Tellerman indicates that many problems arise in the structure of Kushner et al. due to unattainable tolerance requirements. Hence, there remains a need for a durable, high definition spatial light modulation apparatus capable of generating still images or animated scenes in real or delayed time, and a method of fabricating integral components of such an apparatus.

SUMMARY OF THE INVENTION

The general object of the invention is to provide a spatial light modulation apparatus which is capable of generating still images or animated scenes in real or delayed time.

Another object of the invention is to provide a spatial light modulation apparatus which is capable of generating high definition images for maintaining and monitoring precision alignment of optical weapons systems.

An additional object of the invention is to provide a durable spatial light modulation apparatus which is capable of withstanding extreme operational conditions.

A further object of the invention is to provide a method of fabricating an array of pixel posts for use in a spatial light modulation apparatus.

Additional objects and advantages of the invention will be set forth in part in the description which follows, and in part will be obvious for the description, or may be learned by practice of the invention. The objects and advantages of the invention will be realized and obtained by means of the elements in combinations particularly pointed out in the appended claims.

To achieve the objects and in accordance with the purpose of the invention, as embodied and broadly described herein, the invention includes a spatial light modulation apparatus which utilizes selective total internal reflection of light for generating images. Generally, the spatial light modulation apparatus of the present invention utilizes light projected from a light source. The light source can be independent of the spatial light modulation apparatus, or incorporated as an element of the apparatus. Further, the light source may be either a black body light source for projecting undefined broad band light, or a light source for projecting light of a particular spectrum, such as infrared light.

The apparatus of the present invention generally comprises a prism having an internal surface angled for total internal reflection of the light projected from the light source, and means for selectively eliminating pixel areas of reflection of the projected light at the internal surface.

In particular, the prism includes an input end for receiving the projected light, an internal surface angled for total internal reflection of the projected light received through the input end, and an output end for emitting the projected light reflected from the internal surface. The eliminating means includes an array of pixel posts, also known as actuators; each pixel post having a base end and an opposite free end, wherein each pixel post is configured to expand upon being energized to move the free end toward a back face of the internal surface of the prism. The eliminating means further includes means for selecting from the pixel post array a set of pixel posts to be energized which corresponds with the image to be generated, and means for energizing each pixel post of the selected set of pixel posts.

One preferred embodiment of the spatial light modulation apparatus utilizes the light projected from an independent light source, while an alternate preferred embodiment incorporates an infrared light source as part of the present invention. The preferred embodiment of the spatial light modulation apparatus further includes a light-absorbing layer formed on the free end of each pixel post. The pixel post array of the preferred embodiment includes a plurality of pixel posts arranged into rows of pixel posts, wherein each row of pixel posts is formed as a monolithic structure from a slab comprising alternate adjacent layers of electrostrictive material and electrically-conductive material, and divider plates are affixed to and positioned between the slabs to provide a spaced-apart relationship between the rows of pixel posts.

As further embodied and broadly described herein, the invention includes a method of fabricating the pixel post array for use in the spatial light modulation apparatus. The method of the present invention includes the steps of providing a slab of ferroelectric material for each row of pixel posts to be fabricated; securing the slabs together in a front-to-back relationship; and cross-cutting a number of grooves through the top surface of each of the slabs provided to define the pixel posts of each row. The method further includes the step of applying an electrical contact to at least one of the front surface and the back surface of each of the slabs provided at a location corresponding to each pixel post to be fabricated.

In the preferred embodiment of the fabricating method, the electrical contacts are applied during the applying step by vapor-depositing strips of electrically-conductive substance on each of the slabs provided. Further, the slabs are secured together during the securing step by selecting a substrate having an arrangement of divider plates positioned thereon; affixing each of the slabs provided to the substrate with the divider plates positioned between, and affixed to the front surface and the back surface of each of the slabs; and milling the substrate from the affixed slabs with the divider plates remaining therebetween. Although it is preferable to utilize slabs of electrostrictive material, slabs of piezoelectric material may likewise be used with the method of the present invention.

It is to be understood that both the foregoing general description and the following detailed description are exemplary and explanatory only and are not restrictive of the invention, as claimed.

The accompanying drawings, which are incorporated in and constitute part of the specification, illustrate embodiments of the invention and together with the description, serve to explain the principles of the invention.

DESCRIPTION OF THE PREFERRED EMBODIMENTS

Reference will now be made in detail to the present preferred embodiments of the invention, an example of which is illustrated in the accompanying drawings. Wherever possible the same reference numbers will be used throughout the drawings to refer to the same or like parts.

THE SPATIAL LIGHT MODULATION APPARATUS

A common use of a spatial light modulation apparatus is for generating still images and animated scenes in real or delayed time. In its broadest sense, and in accordance with the present invention, the spatial light modulation apparatus of the present invention receives and reflects light projected from a light source, and selectively eliminates pixel areas of reflection of the projected light to form images thereby. Hence, the spatial light modulation apparatus of the invention is substantially comprised of a prism having an internal surface angled for total internal reflection of light projected from a light source, and means for selectively eliminating pixel areas of reflection of the projected light at the internal surface.

Figure 1:
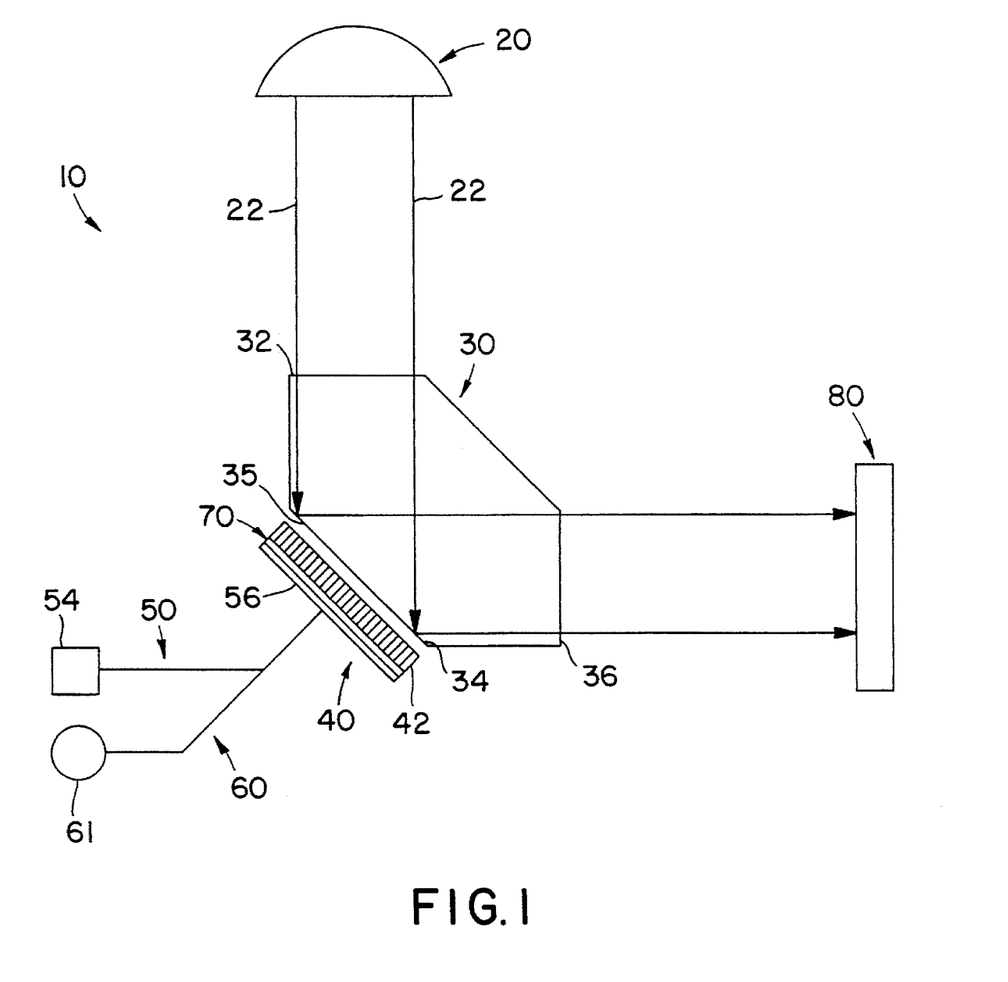
FIG. 1 is a schematic illustration of a representative embodiment of the spatial light modulation apparatus of the present invention.

Specifically, and in accordance with the present invention, the spatial light modulation apparatus may utilize light projected from an independent light source, or may actually incorporate a light source as part of the invention. As embodied herein, and with initial reference to FIG. 1, the spatial light modulation apparatus, as generally designated by reference character 10, utilizes a light source 20 for projecting light into the prism 30. While a broad light source of dispersing light may be used, it is preferable for the light source 20 to project the light as a collimated beam, as shown in FIG. 1. The projection of a collimated beam of light maximizes reflection of the projected light 22 from the internal surface 34 of the prism 30.

The light source 20 in one preferred embodiment of the invention is a black body source which projects light of an undefined broad spectrum. In an alternative preferred embodiment, a light source for projecting infrared light is utilized and incorporated as part of the apparatus. By projecting infrared light 22, the tolerance requirements of the spatial light modulation apparatus 10 can be reduced, as will be discussed below.

Figure 2:
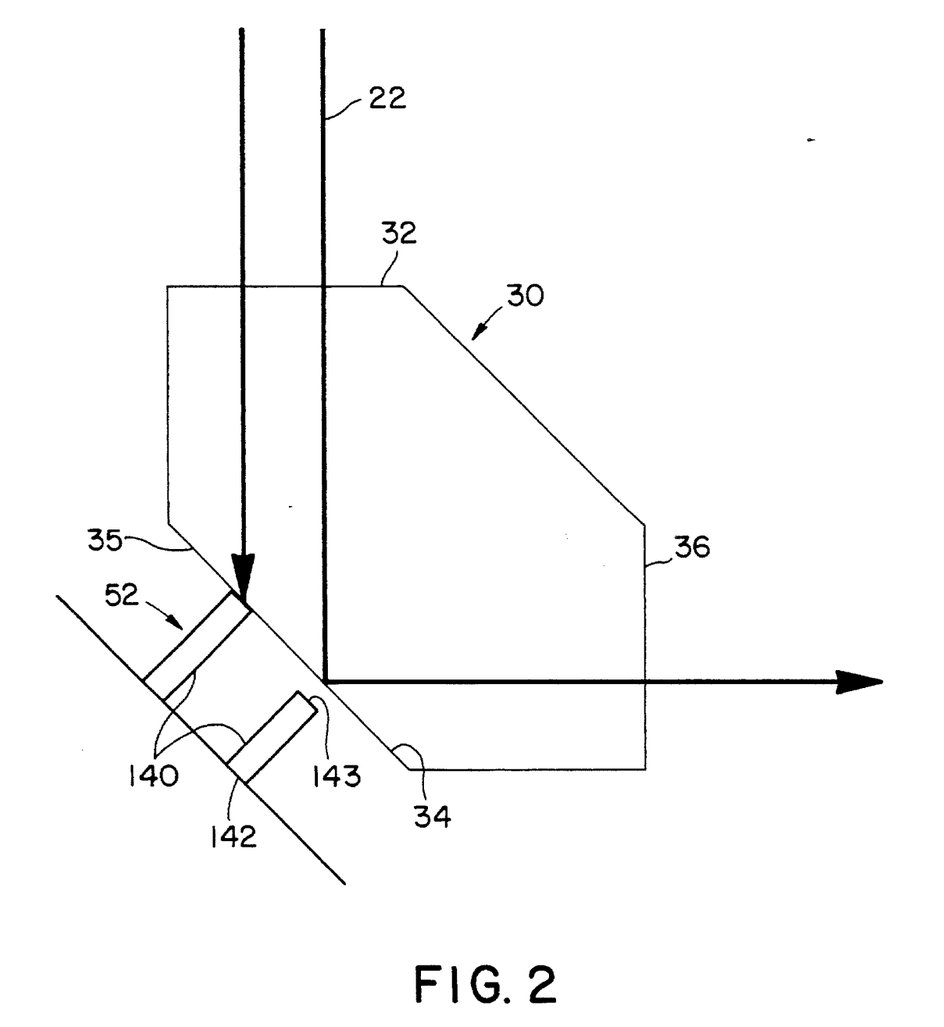
FIG. 2 is an enlarged view of a portion of the schematic illustration of FIG. 1.

As previously mentioned, and in accordance with the present invention, the spatial light modulation apparatus includes a prism for receiving and reflecting the projected light from the light source. FIGS. 1 and 2 show that, as embodied herein, the prism 30 includes an input end 32 for receiving the projected light 22, an internal surface 34 angled for total internal reflection of the projected light 22 received through the input end 32, and an output end 36 for emitting the projected light 22 reflected from the internal surface 34. While reference is made to the internal surface 34 of the prism 30, it is noted that the prism 30 is a solid member and the internal surface 34 generally defines an interface of the prism 30.

Total internal reflection within a prism is well known and need not be discussed in detail. It is sufficient to note that total internal reelection occurs when the index of refraction of the prism is greater than that of the medium at the back face of the internal surface. Further, for total internal reflection to occur, the internal surface of the prism must be angled such that the incident angle of the projected light on the internal surface is greater than the critical angle, as is well known.

As seen in FIG. 1, the projected light 22 from the light source 20 is received by the input end 32 and generally floods the prism 30. By ensuring that the incident angle of the projected light 22 on the internal surface 34 is greater than the critical angle, the projected light 22 is then reflected from the internal surface 34. Upon reflection, the projected light 22 is then emitted from the output end 36 of the prism 30 to means for displaying images, generally designated by reference character 80. The displaying means 80 may include a screen device for displaying visual images, a series of lenses for optical imagery, an assembly of electrical components for electronic imagery, or a combination thereof.

It is noted that the prism 30 embodied in the spatial light modulation apparatus may have any one of a variety of cross sections. For purpose of illustration, FIGS. 1 and 2 show the prism 30 having a hexagonal cross-section; however, triangular and trapezoidal cross-sections are likewise envisioned. The composition of the prism 30 may also be varied among a range of well known transparent materials. Alternatively, the prism may have a planar back face and a series of prismatic ridges along its opposite surface to substantially form a series of independent prisms corresponding with the pixel areas. The preferred embodiment of the prism 30 is solid polished germanium, although alternate materials may likewise be used.

In accordance with the present invention, the spatial light modulation apparatus further includes means for selectively eliminating pixel areas of reflection of the projected light at the internal surface of the prism to form images thereby. That is, the eliminating means essentially creates unilluminated pixel areas within the projected light which is reflected from the internal surface, wherein the unilluminated pixel areas correspond to darker areas of the image to be generated.

It is well known that light which is to be reflected from the internal surface of a prism by total internal reflection actually projects beyond the back face of the internal surface by a distance of about ⅒ wavelength prior to reflection. In this manner, it is understood that selected pixel areas of total internal reflection may be eliminated or destroyed by bringing a structure of corresponding pixel surface area within close proximity, i.e., less than ⅒ wavelength, of the back face of the internal surface.

In fact, if the structure is provided with an appropriate surface, the projected light may even be absorbed by the structure to further enhance elimination of the pixel area of reflection. Further, appropriate tolerance control in the construction and movement of the structure enables the generation of gray scale or shading in the image.

Utilizing this known concept, the eliminating means 40 embodied herein includes an array of pixel posts, wherein each pixel post 140 is generally an actuator having a base end 142 and an opposite free end 143. Each pixel post 140 is configured to expand upon being energized to move its free end 143 toward a back face 35 of the internal surface 34 of the prism 30. As such, when the free end 143 of each pixel post 140 is moved within a distance of about ⅒ wavelength of the projected light 22 from the back face 35 of the internal surface 34, the corresponding pixel area of reflection of the projected light 22 is eliminated. Further, when the light projected from the light source 20 has a specified bandwidth corresponding to infrared light, the tolerance requirements for expansion of the pixel post 140 may be significantly reduced due to the longer wavelength of infrared light.

In one embodiment of the spatial light modulation apparatus, the prism 30 may be supported a fixed distance from the pixel post array 42 by a separate support member (not shown). Alternatively, selected pixel posts may be expanded to support the prism 30 directly thereon. In this manner, the distance between the prism 30 and the pixel post array 42 substantially will be self adjusting to compensate for variable operating conditions, such as temperature.

Figure 8:
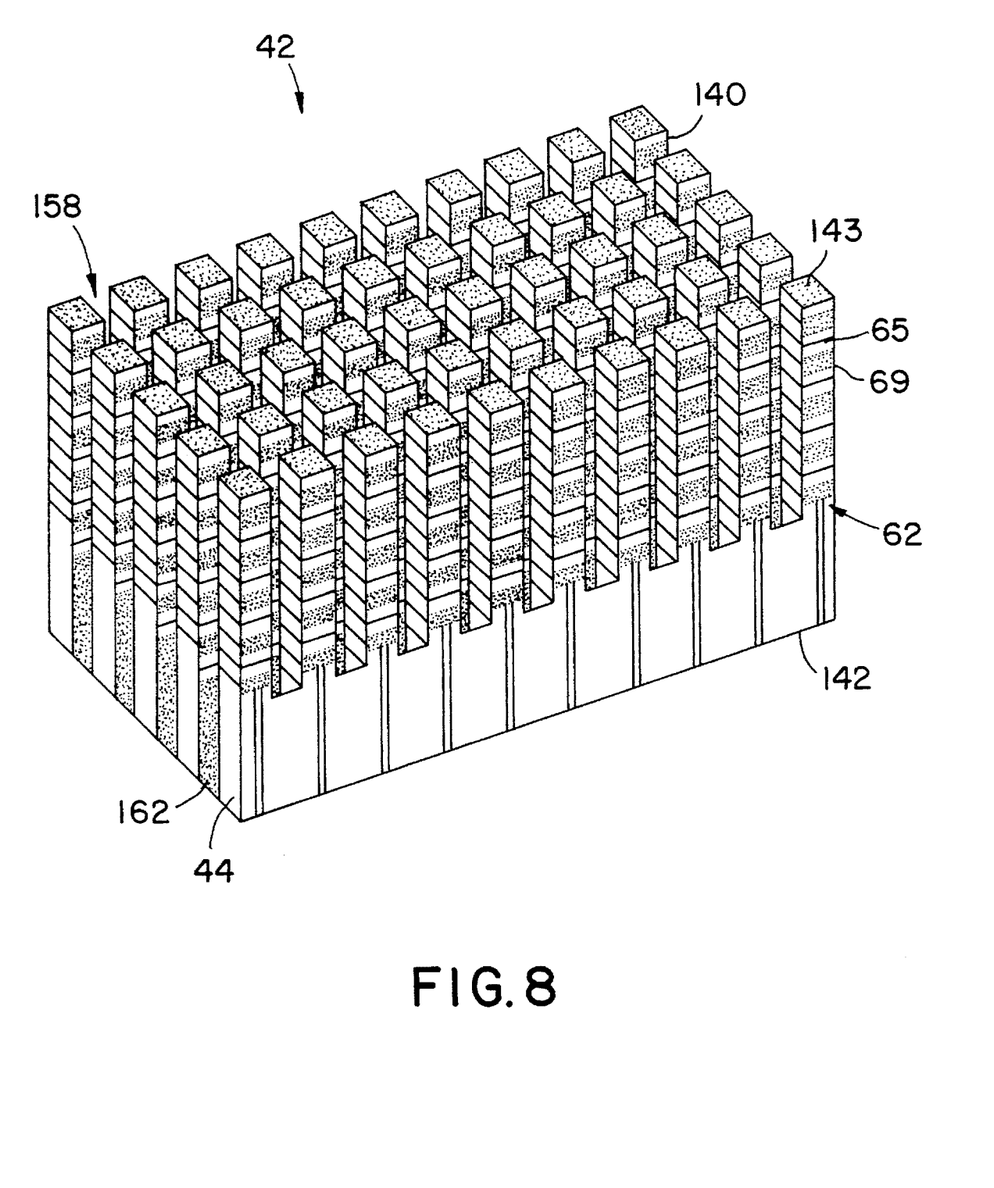
FIG. 8 is an orthographic view of the pixel post array after cross-cutting of the slabs and milling of the substrate has occurred.

A variety of materials and configurations may be utilized in the fabrication of the pixel post array 42. To provide a durable assembly having a long-term life which is capable of generating images of high definition, the pixel post array 42 embodied herein is fabricated with a monolithic sliced-stack construction. FIG. 8 shows the monolithic sliced-stack construction of the pixel post array 42 of the preferred embodiment.

Although the pixel post array of the present invention may be comprised of a single pixel post, FIG. 8 shows that the pixel post array 42 embodied herein preferably includes a plurality of pixel posts arranged into rows of pixel posts. Each row 44 of pixel posts is formed as a monolithic structure from a slab 150 of ferroelectric material, wherein it is understood that ferroelectric materials include electrostrictive and piezoelectric materials. In particular, it is preferable that each row of pixel posts be formed from a slab of electrostrictive material which can be characterized as always expanding upon being energized regardless of the polarity of the charge. By contrast, piezoelectric materials either expand or contract, depending upon the polarity of the charge. Additional favorable characteristics of electrostrictive materials, as compared with those of piezoelectric materials, include greater expansion per unit charge, and less likelihood of arcing between elements.

Specifically, the differences between the electromechanical effects of piezoelectricity and electrostriction are defined by Equation 1 in terms of polarization and by Equation 3 in terms of electric field. That is, strain ($\epsilon$) is defined by:

$$\epsilon = gP + QP^2 \quad (1)$$

where P is the polarization, and g and Q are piezoelectric and electrostrictive coefficients, respectively. Since polarization and applied field are directly related by:

$$P = \epsilon_o KE \quad (2)$$

where $\epsilon_o$ is the permittivity of free space and K is the relative permittivity of the material, the relation between strain ($\epsilon$) and applied electric field (E) for these materials is $$\epsilon = dE + ME^2 \quad (3)$$

where d is the piezoelectric strain coefficient and M is the electrostrictive strain coefficient.

For a piezoelectric material, the second-order term (in P or E) is negligible and the relation of strain to polarization or field becomes linear. Piezoelectrics expand under positive fields, i.e., fields with the same polarity as the poling field, but also contract under negative fields. Therefore, the total usable strain can be enhanced by using both positive and negative drive fields. Regarding electrostrictive materials, however, the first-order term is negligible and the relation of strain to polarization or field becomes quadratic. Thus, there is no advantage to driving with both positive and negative fields.

Although both piezoelectric and electrostrictive effects occur in response to applied electric fields, their fundamental characteristics are distinctly different. The piezoelectric effect is an expansion or contraction in the direction of an applied field (proportional to the electric field) as a result of aligned dipoles in the material wherein the expansion is linear, i.e., directly proportional to the applied field and dependent on the polarity of the electric field. All piezoelectric ceramics have reorientable dipoles. Therefore, dipolar reorientation of piezoelectric material can occur if energy is added to the material by application of field, temperature, or pressure. Reorientation by field, "poling," is an integral part of the fabrication of a piezoelectric material. Poling creates the initial remanent dipolar orientation of the material, i.e., its domain structure. Piezoelectrics have, to some extent, a gradual drift (piezoelectric creep) from their initial shape (position) with continued cycling; this again is a result of the poled domain structure.

By contrast, the electrostrictive effect, which is predominant in paraelectric materials, is a lattice expansion in the direction of an applied field that is proportional to the square of the applied electric field. Thus, it is not dependent on the polarity of the field. Since there are no energy barriers to lattice motion, electrostriction is inherently non-hysteretic. Because electrostrictive materials are not dependent on the alignment of a domain structure, there is no drift in starting position with continued cycling. The electrostrictive material has a long-term "shape memory" advantage over piezoelectrics. This is considered a discriminating feature in the development of a reliable spatial light modulator.

The spatial light modulation apparatus which is regarded as the subject matter of the present invention is not intended to be restricted by the principles explained above but only by the appended claims. Rather, the above explanation has been included merely to assist in understanding the operation of electrorestrictive materials relative piezoelectric materials.

Figure 4:
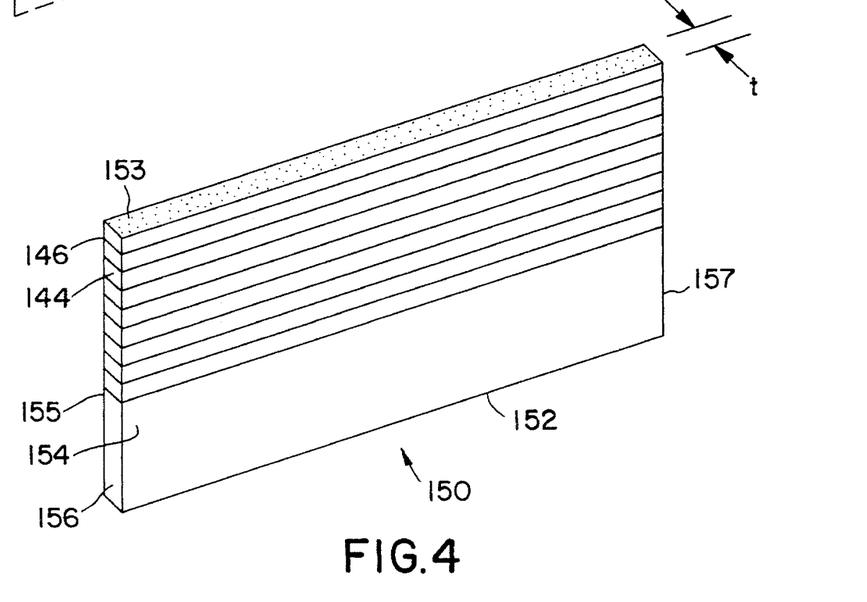
FIG. 4 is an orthographic view of a slab obtained from the block of FIG. 3.
Figure 5:
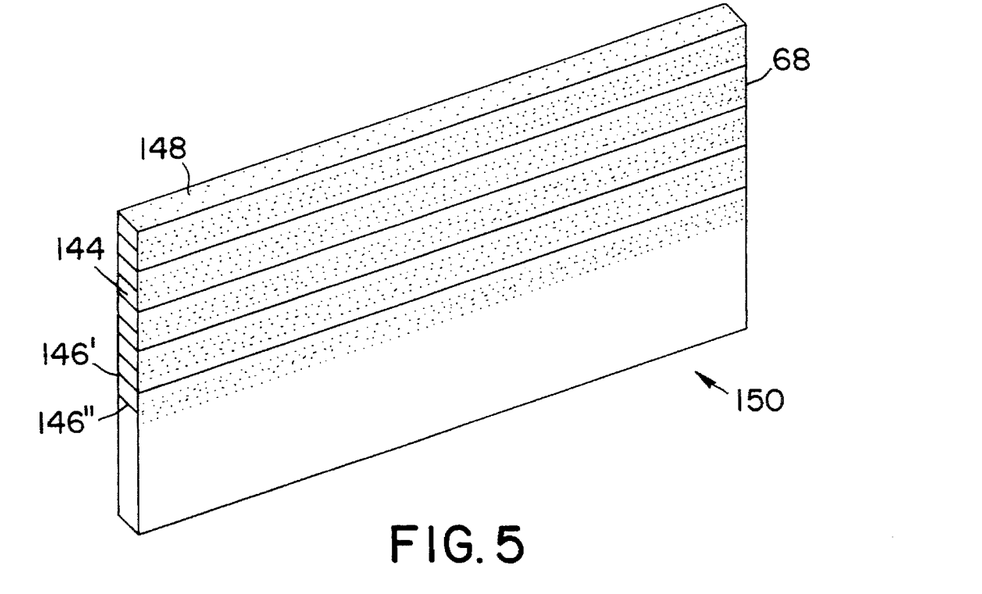
FIG. 5 is an orthographic view of the slab of FIG. 4 having lateral strips of an electrically-isolating substance applied thereon.
Figure 6:
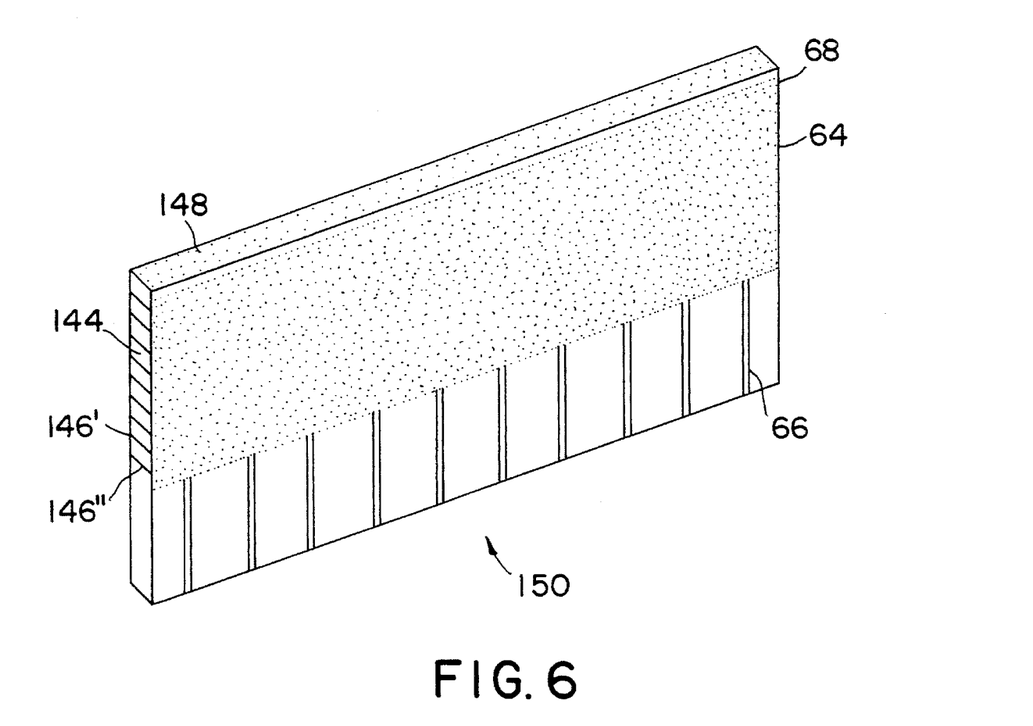
FIG. 6 is an orthographic view of the slab of FIG. 5 further having lateral and longitudinal strips of an electrically-conductive substance applied thereon.

As seen in FIGS. 4 through 6, each slab 150 used for fabricating the pixel post array 42 has a predetermined thickness "t." This thickness "t" corresponds to one side dimension of the surface of the free end 143 of each pixel post 140, i.e., the pixel area. The pixel posts of each row 44 are formed by crosscutting a number of grooves 158 along the lateral direction of each slab 150. The distance between the grooves 158 determines the second side dimension of the pixel area. The slabs 150 which form the rows 44 of pixel posts are affixed together in a front-to-back, spaced-apart relationship to create the pixel post array 42. FIG. 8 shows that divider plates 162 are affixed to and positioned between the slabs 150 to provide the spaced-apart relationship therebetween. Preferably, the divider plates 162 are made of an electrically-isolating, fine-grain sized material, such as an alumina silicate. In this manner, it is envisioned that a pixel post array 42 having 256×256 pixels within approximately a one (1) square inch area may be fabricated, wherein the dimension of each pixel area is about 100 microns per side. Of course, the actual dimensions of the pixel post array 42 will be dependent upon the requirements and intended application of the spatial light modulation apparatus. The method of fabricating such a pixel post array 42 will be discussed in greater detail below.

Preferably, and as seen in FIG. 8, each slab 150 includes alternate adjacent layers of ferroelectric material 144 and electrically-conductive material 146 stacked in the longitudinal direction of the pixel posts. More specifically, it is preferred that each slab 150 includes alternate adjacent layers of electrostrictive material 144 and electrically-conductive material 146. By applying an electrical charge to the adjacent layers of electrically-conductive material 146, the voltage required to expand each pixel post may be significantly reduced and the applied electrical charge may be uniformly provided throughout the layers of electrostrictive material 144 of each pixel post 140. Since total expansion of each pixel post 140 is determined by the electrical field (voltage per unit length) of the electrostrictive material, uniform charging of the electrostrictive material 144 enables a higher field density for a given voltage throughout each pixel post 140. In turn, this higher field density enhances the expansion of each pixel post 140 in the longitudinal direction, and improves the efficiency of the spatial light modulation apparatus, as a whole.

It is anticipated that virtually any reasonable combination of ferroelectric and electrically-conductive materials may be utilized to constitute the slabs 150 which form each row 44 of pixel posts. Examples of known ferroelectric materials include barium titanate, $BaTiO_3$, known as BT; lead titanate, $PbTiO_3$, known as PT; lead zinc niobate or appropriately modified forms thereof, $Pb(Zn_{1/3}Nb_{2/3})O_3$, known as PZN; lead zirconate titanate, $Pb(Zr_xTi_{1-x})O_3$, known as PZT; lead magnesium niobate, $Pb(Mg_{1/3}Nb_{2/3})O_3$, known as PMN; and modified PMN, PMN-PT-BT, known as PMN-X and disclosed in U.S. Pat. No. 5,023,032 issued Jun. 11, 1991 which is incorporated by reference herein. It is preferable to utilize an electrostrictive material, such as PMN or PMN-X. Likewise, Common electrically-conductive materials include silver palladium, Ag-Pd; gold, Au; and gold platinum palladium, Au-Pt-Pd; although platinum, Pt, is currently preferred because it is free from oxidation problems. That is, the preferred embodiment of the invention includes a pixel post array 42 comprising alternate adjacent layers of PMN-X and platinum. Ultimately, however, it is envisioned that silver palladium may be preferred as the electrically-conductive material due to its reduced costs.

A preferred embodiment of the spatial light modulation apparatus 10 further includes a light-absorbing layer 148 formed on the free end 143 of each pixel post 140. The light-absorbing layer 148 enhances the efficiency of the spatial light modulation apparatus 10 by actually absorbing the corresponding pixel area of projected light 22 when the free end 143 is moved to a position proximate the back face 35 of the internal surface 34 of the prism 30 by selective expansion of the pixel post 140. Preferably, the light-absorbing layer 148 includes a thin coating of a wavelength absorbing material, such as Martin Black or a similar flat-black substance on the free end 143 of each pixel post 140. The light-absorbing layer also includes a light-coupling substrate, such as polished germanium or zinc selenide, applied over the flat-black wavelength absorbing material to enhance the durability of each pixel post 140. Of course, alternative compositions of the light-absorbing layer may be desired.

The eliminating means 40 of the present invention, as embodied herein, further includes means for selecting from the pixel post array 42 a set 52 of pixel posts to be energized which corresponds with the image to be generated. That is, the selecting means 50 preferably determines which pixel posts correspond to the darker areas of the image to be generated relative the illuminated areas of the image, which are represented by the projected light 22 emitted from the output end 36 of the prism 30. Hence, depending on the image to be generated, the selected set of pixel posts may range from no pixel posts being selected, to all of the pixel posts of the array being selected. The selecting means 50 may simply select individual sets 52 of pixel posts for still image generation, or, as in the preferred embodiment, the selecting means 50 may be capable of continuously altering the selected set 52 of pixel posts for animated scene generation in either real or delayed time. The selecting means 50 preferably includes a computer or multiplexer 54, or similar processing unit, for determining the corresponding pixel posts 140 to be selected, and an electrical switching device 56 for actually selecting the pixel posts 140 to be energized.

In the preferred embodiment, the selecting means also controls the position of the free end of each selected pixel post relative the back face 35. The ability to position the ferroelectric pixel posts within fractions of microns allows the generation of a gray scale. That is, the pixel post can be finely positioned to achieve partial absorption. A demonstration of this function was performed wherein one multi-layer pixel with an attached germanium absorbing layer was activated to absorb infrared light from a germanium prism. Only 0.75 microns was needed to achieve full absorption, and shades of gray were noted at lower displacements.

Ferroelectric materials, particularly electrostrictive materials, are known to hold an electrical charge for extended periods of time, and thus, maintain an expanded state. This characteristic of the electrostrictive material enhances the efficiency of the spatial light modulation apparatus embodied herein by minimizing the amount of energy required to maintain the selected pixel posts 140 in the expanded state. However, additional grounding means may be required to remove the electrical charge from individual selected pixel posts 140 during animated scene generation when the pixel areas corresponding to these individual selected pixel posts 140 are subsequently desired to be illuminated, and thus de-energized. Hence, it is noted that the selecting means 50 may further identify the pixel posts 140 corresponding to the illuminated areas of the image to be generated, and include grounding means for grounding these identified pixel posts 140 to remove any electrical charge held therein.

Finally, the eliminating means 40 embodied in the present invention comprises means 60 for energizing each pixel post 140 of the selected set 52 of pixel posts. Generally, the preferred energizing means 60 includes a power source 61 and at least one electrical contact 62 formed on each pixel post 140 of the pixel post array 42. It is noted that if only one electrical contact 52 is formed on the pixel post 140, a second contact should be provided proximate the pixel post to complete the electric circuit. In this manner, and as discussed above, the selecting means 50 connects the electrical contacts 62 formed on or provided proximate each of the selected pixel posts 140 to the power source 61.

As previously mentioned, and as seen in FIG. 8, each pixel post 140 of the pixel post array 42 includes alternate adjacent layers of ferroelectric material 144 and electrically-conductive material 146. The electrical contact 62 formed on each pixel post 140 communicates electrically with layers of electrically-conductive material 146 to provide an electrical charge to each adjacent layer of ferroelectric material 144.

In the preferred embodiment, two electrical contacts 62 are formed on each pixel post 140. One of the two electrical contacts 62 electrically communicates with a first series 146' of the layers of electrically-conductive material 146 and is electrically isolated from a second series 146" of the layers of electrically-conductive material 146. By contrast, the other of the two electrical contacts 62 electrically communicates with the second series 146" of the layers of electrically-conductive material 146 and is electrically isolated from the first series 146' of the layers of electrically-conductive material 146. The two electrical contacts 62 may be formed adjacent each other on the same surface of each pixel post 140, or, as in the preferred embodiment of FIG. 8, on opposite surfaces of each pixel post 140.

For purpose of illustration, FIG. 8 shows one of the two electrical contacts 62 being formed on the front surface 154 of each pixel post 140 in the preferred embodiment. The other of the two electrical contacts 62 of each pixel post 140 in the preferred embodiment is formed on the opposite, back surface 155 of each pixel post 140, which is not visible in FIG. 8. The layers of electrically-conductive material 146, as seen in FIG. 8, alternate between the first series 146' and the second series 146". In this manner, a higher field density may be created, thus enhancing the efficiency of the spatial light modulation apparatus 10. The method of fabricating these electrical contacts 62 will be discussed in greater detail below.

The preferred embodiment of the spatial light modulation apparatus 10 also includes means 70 for cooling the pixel post array 42. During operation of the spatial light modulation apparatus 10, the ferroelectric material 144 tends to absorb heat energy during electrical charging. Characteristically, the ferroelectric material 144 is less responsive to electrical charging as its temperature increases, thus expansion is reduced. Further, as the temperature of the ferroelectric material increases, the pixel posts 140 radiate energy into the adjacent prism 30. This radiation of energy distorts the resulting image generated, particularly when infrared light is utilized. To optimize efficiency of the spatial light modulation apparatus 10 and minimize distortion of the image generated, cooling means 70 is provided to maintain the pixel post array 42 at a reduced temperature. The cooling means 70 preferably comprises a conventional cooling plate positioned beneath the base ends 142 of the pixel posts 140. Alternate embodiments of the cooling means 70 may likewise be envisioned.

In view of the description provided above, the operation of the spatial light modulation apparatus embodied herein may readily be understood. Projected light 22 from the light source is received by the input end 32 of the prism 30. The projected light 22, having an incident angle on the internal surface 34 greater than the critical angle, is reflected from the internal surface 34 so as to be emitted from the output end 36 of the prism 30 to the displaying means 80.

The pixel post array 42 of the eliminating means 40 is positioned proximate the back face 35 of the internal surface 34. When the eliminating means 40 is not operated, the projected light 22 floods the displaying means 80 as a solid illuminated area. In operation, however, the selecting means 50 selects a set 52 of pixel posts which corresponds to the darker areas of the image to be generated. The electrical contacts 62 on each of the selected pixel posts 140 are thereby connected to the power source 61, wherein the energizing means 60 comprises the electrical contacts 62 and the power source 61.

As schematically demonstrated in FIG. 2, each of the pixel posts 140 from the selected set 52 expands upon being energized to move its free end 143 toward the back face 35 of the internal surface 34 of the prism 30. When the free end 143 of the energized pixel post 140 is moved to a position proximate the back face 35, the light-absorbing layer 148 formed on the free end 143 of the pixel post 140 absorbs at least a portion of the corresponding pixel area of projected light 22. By contrast, the projected light 22 is reflected from the internal surface 34 of the prism 30 at the pixel areas corresponding to the de-energized pixel posts 140 which were not selected. In this manner, animated images or scenes map be generated by continuously selecting and energizing sets of pixel posts corresponding to the darker areas of the images and identifying and grounding areas corresponding to the illuminated areas of the images. It is noted that the expansion of the pixel post 140 schematically demonstrated in FIG. 2 is exaggerated for purpose of explanation, and should not be considered to scale.

THE METHOD OF FABRICATING

The present invention further includes a method of fabricating a pixel post array for use in a spatial light modulation apparatus. In accordance with the present invention, the pixel post array is defined by an arrangement of rows of pixel posts. The fabricating method of the present invention is schematically and sequentially presented in FIGS. 3–8.

Figure 3:
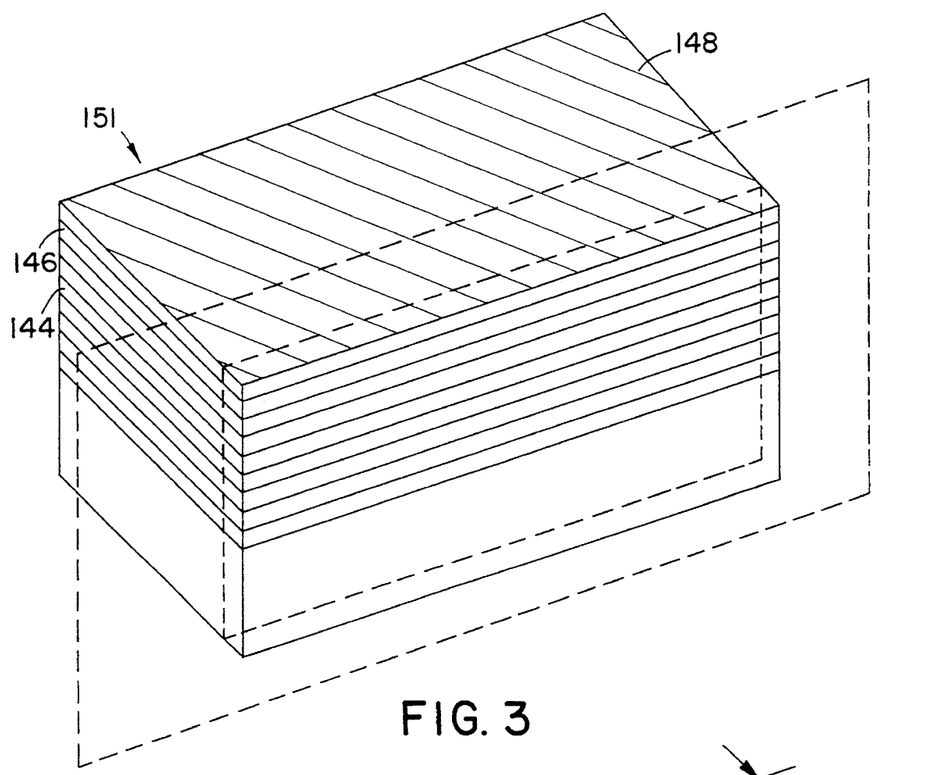
FIG. 3 is an orthographic view of a block comprising alternate adjacent layers of ferroelectric material and electrically-conductive material.

As seen in FIGS. 3 and 4, and in accordance with the present invention, the fabricating method includes the step of providing a slab of ferroelectric material having a predetermined thickness "t" for each row of pixel posts to be fabricated. As embodied herein, each of the slabs 150 provided are apportioned from a block 151 of ferroelectric material, wherein it is noted that ferroelectric materials include electrostrictive and piezoelectric materials.

FIG. 3 shows that the block 151, and subsequently each of the slabs 150 provided, preferably includes alternate adjacent layers of ferroelectric material 144 and electrically-conductive material 146. As previously mentioned, it is preferable to select an electrostrictive material as the ferroelectric material, although any reasonable combination of ferroelectric and electrically-conductive materials may be utilized. That is, alternate adjacent layers of piezoelectric and electrically-conductive material could be selected for the method of the present invention, if desired. In the preferred embodiment, the ferroelectric and electrically-conductive materials selected are PMN-X and platinum, respectively. Further, it is preferable to form a light-absorbing layer 148 on the upper surface of the block 151 prior to apportioning the slabs 150 to simplify construction, although the light-absorbing layer 148 may be formed during a separate step later in the fabricating method, if desired.

During the providing step, the block 151 is apportioned into slabs 150 of predetermined thickness "t", wherein each of the slabs 150 has a top surface 153, a bottom surface 152, a front surface 154, a back surface 155, and two end surfaces 156, 157. See, FIG. 4. Each slab 150 may be apportioned from the block 151 by a precision saw, a laser, or any other conventional method. In this manner, the alternate adjacent layers of ferroelectric material 144 and electrically-conductive material 146 extend between the front surface 154 and the back surface 155 of each of the slabs 150 provided, with the light-absorbing layer 148 being provided on the top surface 153 of each slab 150.

In accordance with the present invention, the fabricating method further includes the step of applying an electrical contact to at least one of the front surface and back surface of each of the slabs provided at a location corresponding to each pixel post to be fabricated. As embodied herein, the electrical contacts are connected to the layers of electrically-conductive material for electrical communication therebetween. FIGS. 5 and 6 demonstrate the preferred sequence of applying the electrical contacts 62 to each slab 150.

In the preferred embodiment of the fabricating method, lateral strips of electrically-isolating substance 68 are applied to a first series 146' of the layers of electrically-conductive material 146 on the back surface 155 of each of the slabs 150 provided, while lateral strips of electrically-isolating substance 68 are applied to a second and alternate series 146" of layers of the electrically-conductive material 146 on the front surface 154 of each slab 150. See, FIG. 5. As noted above, and for purpose of illustration, the layers of electrically-conductive material alternate between the first series 146' and the second series 146".

Similarly, lateral strips of electrically-conductive substance 64 are applied to the first series 146' of the layers of electrically-conductive material 146 on the front surface 154 of each of the slabs 150 provided, as seen in FIG. 6, while lateral strips of electric ally-conductive substance 64 are applied to the second series 146" of layers of the electrically-conductive material 146 on the back surface 155 of each slab 150. FIG. 6 further shows that longitudinal strips of electrically-conductive substance 66 are also applied to the front and back surfaces 154, 155 of each of the slabs 150 provided to interconnect the individual lateral strips of electrically-conductive substance 64 applied to the front and back surfaces, respectively. These longitudinal strips are applied at locations corresponding to each pixel post 140 to be fabricated. The longitudinal strips of electrically-conductive substance 66 may be applied sequential to the application of the lateral strips of electrically-conductive substance 64, or simultaneously therewith. It is noted that the longitudinal strips of electrically-conductive substance 66 are applied over the lateral strips of electrically-isolating substance 68 so as to be electrically-isolated from the corresponding layers of electrically-conductive material 146 therebelow.

Any of a variety of methods and substances may be used for applying the strips of electrically-isolating and electrically-conductive substances. Examples of electrically-isolating substances include such dielectric elements as silica based materials and similar photoresistors. Examples of electrically-conductive substances include platinum, palladium, aluminum, silver, and gold. In the preferred embodiment of the fabricating method, a silica based material is used as the electrically-isolating substance, while gold is preferred as the electrically-conductive substance. It is preferable to apply the electrically-isolating and electrically-conductive substances by vapor-depositing techniques, although other conventional methods for applying the substances may be utilized.

In accordance with the present invention, the fabricating method also includes the step of securing the slabs together in a front-to-back relationship. It is possible to secure the front surface of one slab directly to back surface of another slab utilizing an appropriate epoxy or similar substance. However, since it is advantageous to maintain a spacing between the rows of pixel posts to ensure freedom of expansion, the securing step embodied herein includes positioning divider plates between the slabs and affixing the divider plates thereto.

Figure 7:
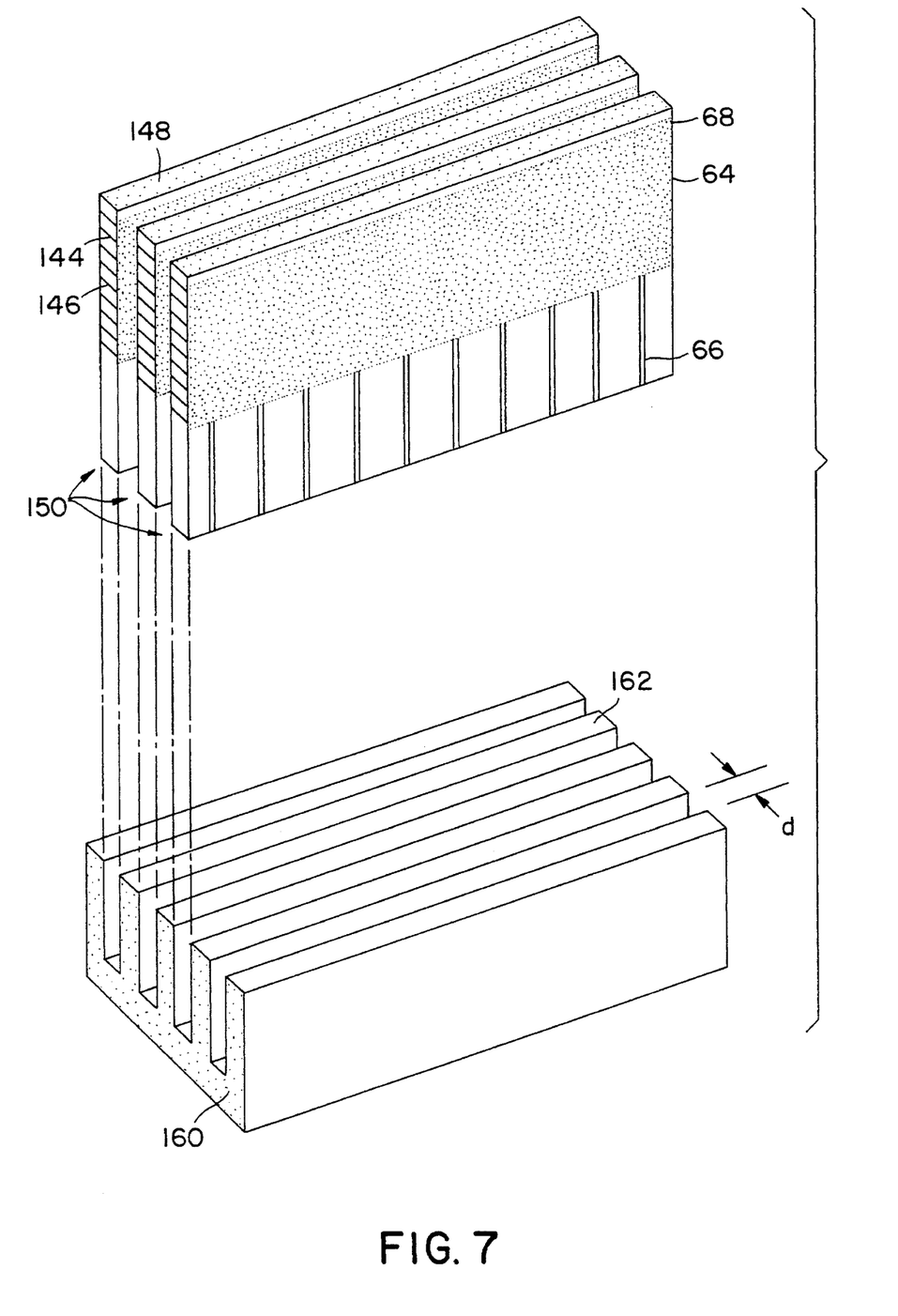
FIG. 7 is an orthographic view of an arrangement of slabs being affixed to a substrate base.

FIG. 7 demonstrates one embodiment of the securing step of the invention. The securing step includes selecting a substrate 160 having an arrangement of divider plates 162 positioned thereon. The divider plates 162 are spaced apart a distance "d" substantially equal to the predetermined thickness "t" of each of the slabs 150 provided. Preferably, the substrate 160 and divider plates 162 are ceramic or the like, although alternative materials may be used. In the preferred embodiment, the substrate 160 and divider plates 162 are milled from a solid block of alumina silicate, which is sold under the trademark Pyro-Seram 9606.

The securing step embodied herein, and demonstrated in FIG. 7, includes affixing each of the slabs 150 provided to the substrate 160. The divider plates 162 are positioned between and affixed to the front surface 154 and the back surface 155 of the slabs 150 until all of the slabs 150 provided are secured together in a front-to-back, spaced-apart relationship. Generally, any standard low temperature epoxy, such as SPURS low viscosity epoxy embedding material sold by Polysciences, Inc., located in Warrington, Pa., may be used to affix the slabs 150 to the substrate 160 and divider plates 162. By securing divider plates 162 between the slabs 150, the pixel posts 140 which are formed from each slab 150 are maintained spaced from the adjacent rows 44 of pixel posts, thus ensuring freedom of expansion of each pixel post 140 in the longitudinal direction. Further, by forming the divider plates 162 from electrically-isolating material, such as alumina silicate, inadvertent energizing of pixel posts 140 adjacent the selected pixel posts 140 is also minimized.

Once the slabs 150 are secured to the substrate 160, the preferred embodiment of the fabricating method includes filling the spaces between the slabs 150 with a removable substance, such as crystal bond or, the like. The crystal bond enhances the stability of the slabs 150 if additional fabricating steps are still required. Such additional steps may include milling the substrate 160 from the affixed slabs 150, cross-cutting grooves 158 through each of the slabs 150 provided, or forming light-absorbing layers 148 on the free end 143 of each pixel post 140, as will be discussed below. Once fabrication of the pixel post array 42 is complete, the crystal bond is easily removed without disturbing the pixel posts 140 of the pixel post array 42 by using an acetone wash or the like.

The securing step embodied herein further includes milling the substrate 160 from the affixed slabs 150. During the milling step, the front-to-back, spaced-apart relationship between the affixed slabs 150 is maintained, with the divider plates 162 remaining positioned between and affixed to the front surface 154 and the back surface 155 of the slabs 150 provided. The milling step may be performed directly after affixing the slabs 150 to the substrate 160, or as the last step of the fabricating method. Alternatively, the milling step may be omitted, with the substrate 160 forming an integral part of the pixel post array 42, if desired.

To form the pixel posts of each row, and in accordance with the present invention, the fabricating method includes the step of cross-cutting a number of grooves through the top surface of each of the slabs provided. These grooves extend longitudinally from the top surface of each slab to define the pixel posts of each row. As seen in FIG. 8, each groove 158 is cross-cut through the predetermined thickness "t" of each of the slabs 150 provided. It is noted that the cross-cutting step also defines the height in the longitudinal direction and cross-sectional area of each pixel post 140, as well as the total number of pixel posts 140 in each row.

As further seen in FIG. 8, the grooves 158 are located between the electrical contacts 62 which were applied to each of the slabs 150 at locations corresponding to the pixel posts 140. That is, the grooves 158 vertically extend through and segment the lateral strips of electrically-conductive substance 64 and electrically-isolating substance 68 which were vapor-deposited on the front and back surfaces of each slab 150. In this manner, each electrical contact 62 resembles a set of interconnected patches 65 of electrically-conductive substance formed on each pixel post 140. The interconnected patches 65 of electrically-conductive substance electrically communicate with one series of electrically-conductive material 144, and are electrically-isolated from the alternate series of layers of electrically-conductive material by patches 69 of electrically-isolating substance, as best seen in FIG. 8.

Preferably, the cross-cutting step is performed after the slabs 150 have been secured together on the substrate 160 with the divider plates 162 positioned therebetween. In this manner, fabricating costs may be reduced, while precision is enhanced. As previously mentioned, crystal bond may be filled in the spaces between the adjacent slabs 150 to provide additional stability during this preferred cross-cutting step. If desired, however, each slab 150 may be separately cross-cut with the number of grooves 158 prior to being secured to an adjacent slab or to the substrate 160. The cross-cutting step may be performed using a precision saw, a laser, or similar cutting device.

If the light-absorbing layer 148 was not previously formed, the fabricating method may include forming a light-absorbing layer 148 on the free end 143 of each of the pixel posts 140. Of course, and as discussed above, the preferred embodiment of the fabricating method includes initially forming the light-absorbing layer 148 on the block 151 prior to apportioning each of the slabs 150 provided. As further indicated above, the preferred embodiment of the light-absorbing layer 148 includes a wavelength absorbing material such as Martin Black or a similar flat-back substance. The light absorbing layer also includes a light-coupling substrate, such as polished germanium or zinc selenide formed over the flat-black coating.

Once completed, base contacts (not shown) can be attached to the base of the pixel post array 42 to connect the selecting means 50 and the energizing means 60 of the spatial light modulation apparatus with each pixel post 140. If the substrate 160 has been milled from the pixel post array 42, a known method, such as bump bonding, may be used to attach the base contacts. However, if the substrate 160 is maintained, more complex connections will be required. For example, the substrate 160 may be prefabricated with the base contacts formed therein. Additionally, silicone or a similar resilient material may be filled between the pixel posts 140 and the rows 44 of pixel posts after the crystal bond has been removed. The silicone provides lateral support to each pixel post 140 while maintaining longitudinal freedom for expansion of each pixel post 140. Hence, a durable, high definition spatial light modulation apparatus capable of generating still images or animated scenes in real or delayed time may be fabricated.

It will be apparent to those skilled in the art that various modifications and variations can be made in the design of the spatial light modulation apparatus of the present invention and in fabricating method of the pixel post array without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A spatial light modulation apparatus for generating an image utilizing light projected from a light source, the apparatus comprising:

a prism having an input end for receiving the projected light, a boundary surface angled for total internal reflection of the projected light received through the input end, and an output end for emitting the projected light reflected from the boundary surface; and means for eliminating total internal reflection of the projected light at selected pixel areas of the boundary surface to form the image thereby, the eliminating means including a pixel post array including a plurality of pixel posts arranged into rows, each row of pixel posts formed as a monolithic structure from a respective slab of ferroelectric material each pixel post having a base end and an opposite free end each pixel post being configured to expand upon being energized to move the free end toward the boundary surface of the prism to eliminate total internal reflection of the projected light at the pixel area corresponding to the free end of the pixel post, means for selecting from the pixel post array a set of pixel posts to be energized, the set of pixel posts corresponding with the image, and means for energizing each pixel post of the selected set of pixel posts.

2. The apparatus of claim 1, wherein each pixel post of the pixel post array includes alternate adjacent transverse layers of ferroelectric material and electrically-conductive material; and further wherein the energizing means communicates electrically with the layers of electrically-conductive material to provide an electrical charge to each adjacent layer of ferroelectric material.

3. The apparatus of claim 1, wherein divider plates are affixed to and positioned between the respective slabs to provide a spaced-apart relationship between the rows of pixel posts.

4. The apparatus of claim 1, wherein the eliminating means further includes a light-absorbing layer formed on the free end of each pixel post for absorbing the protected light at the pixel area corresponding to the free end when the free end is moved to a position proximate the boundary surface of the prism by selective expansion of the pixel post.

5. A spatial light modulation apparatus for generating an image utilizing light projected from a light source, the apparatus comprising:

a prism having an input end for receiving the projected light, a boundary surface angled for total internal reflection of the projected light received through the input end, and an output end for emitting the projected light reflected from the boundary surface; and means for eliminating total internal reflection of the projected light at selected pixel areas of the boundary surface thereby to form an image, the eliminating means including an array of pixel posts each pixel post made of alternate adjacent transverse layers of ferroelectric material and electrically-conductive material, each pixel post having a base end and an opposite free end, the layers of ferroelectric material of each pixel post configured to expand up on being energized to move the free end toward the boundary surface of the prism to eliminate total internal reflection of the projected light at the pixel area corresponding to the free end of the pixel post, means for selecting from the pixel post array a set of pixel posts to be energized, the set of pixel posts corresponding with the image, and means for energizing each pixel post of the selected set of pixel posts, the energizing means communicating electrically with the layers of electrically-conductive material to provide an electrical charge to the adjacent layers of ferroelectric material.

6. The apparatus of claim 5, wherein the eliminating means further includes a light-absorbing layer formed on the free end of each pixel post for absorbing the projected light at the pixel area corresponding to the free end when the free end is moved to a position proximate the boundary surface of the prism by selective expansion of the pixel post.

7. The apparatus of claim 5, wherein the pixel post array includes a plurality of pixel posts arranged into rows of pixel posts, each row of pixel posts formed as a monolithic structure from a respective slab comprising the alternate adjacent transverse layers of ferroelectric material and electrically-conductive material; and further wherein the energizing means includes at least one electrical contact formed on each pixel post, each electrical contact electrically communicating with the layers of electrically-conductive material to provide an electrical charge to the adjacent layers of ferroelectric material.

8. The apparatus of claim 7, wherein two electrical contacts are formed on each pixel post, one of the two electrical contacts electrically communicating with a first series of the layers of electrically-conductive material and being electrically isolated from a second series of the layers of electrically-conductive material, the other of the two electrical contacts electrically communicating with the second series of the layers of electrically-conductive material and being electrically isolated from the first series of the layers of electrically-conductive material.

9. The apparatus of claim 7, wherein divider plates are affixed to and positioned between the respective slabs to provide a spaced-apart relationship between the rows of pixel posts.

10. The apparatus of claim 5 further comprising means for cooling the pixel post array.

11. The apparatus of claim 1, wherein the ferroelectric material is an electrostrictive material.

12. The apparatus of claim 1, wherein the selecting means selects the set of pixel posts in real time for animated scene generation.

13. The apparatus of claim 1, wherein infrared light is projected from the light source.

14. The apparatus of claim 5, wherein the ferroelectric material is an electrostrictive material.

15. The apparatus of claim 5, wherein the selecting means selects the set of pixel posts in real time for animated scene generation.

16. The apparatus of claim 5, wherein infrared light is projected from the light source.

* * * * *

UNITED STATES PATENT AND TRADEMARK OFFICE
CERTIFICATE OF CORRECTION

PATENT NO. : 5,455,709
DATED : October 3, 1995
INVENTOR(S) : Thomas C. Dula, III et al It is certified that error appears in the above-indentified patent and that said Letters Patent is hereby corrected as shown below:

Title Page, Item [75], "Inventors", add --Andrew P. Ritter, Surfside Beach, SC--; Item [57], "ABSTRACT", line 10, "no" should read --to--.

Column 1, line 48, after "See" delete the period (.); line 63, "Spraque" should read --Sprague--.

Column 2, line 16, "a signed" should read --assigned--.

Column 5, line 13, "reelection" should read --reflection--; line 65, delete the paragraph indentation beginning with the word "In".

Column 7, line 38, "non-hysteretic" should read --nonhysteretic--; line 56, "crosscutting" should read --cross-cutting--.

Column 8, line 41, "Common" should read --common--.

Column 11, line 11, "map" should read --may--.

Column 12, line 23 "electric ally" should read --electrically--.

Column 13, line 32, after "or" delete the comma (,).

Column 14, line 36, after "material" insert a comma (,).

Column 15, line 19, after "material" insert a comma (,); line 20, after "end" insert a comma (,); line 44, "protected" should read --projected--; line 55, after "and" indent paragraph with word "means"; line 60, after "posts" insert a comma (,).

UNITED STATES PATENT AND TRADEMARK OFFICE
CERTIFICATE OF CORRECTION

PATENT NO. : 5,455,709

DATED : October 3, 1995

INVENTOR(S) : Thomas C. Dula, III et al

It is certified that error appears in the above-indentified patent and that said Letters Patent is hereby corrected as shown below:

Column 16, line 2, "up on" should read --upon--.

Signed and Sealed this

Fifth Day of March, 1996

*Attest:*

BRUCE LEHMAN

*Attesting Officer*  *Commissioner of Patents and Trademarks*